United States Patent [19]

Gleason et al.

[11] Patent Number: 4,664,710

[45] Date of Patent: May 12, 1987

[54] DIRECT PROCESS FOR THE PRODUCTION OF PRINTING INKS

[75] Inventors: Francis E. Gleason; Deborah A. Emmert; Matthew McClure, all of Cincinnati; Ronald W. McEwan, Westchester, all of Ohio

[73] Assignee: Sun Chemical Corporation, New York, N.Y.

[21] Appl. No.: 461,378

[22] Filed: Jan. 27, 1983

[51] Int. Cl.4 ............................................. C09D 11/02
[52] U.S. Cl. ...................................... 106/23; 106/309
[58] Field of Search ................... 106/20, 22, 23, 309, 106/308 Q

[56] References Cited

U.S. PATENT DOCUMENTS 4,017,448 4/1977 Panush ............................... 260/31.4
4,227,936 10/1980 Osswald et al. ...................... 106/309
4,244,863 1/1981 Hemmerich et al. .............. 260/42.55
4,309,320 1/1982 Arora et al. ......................... 106/309

OTHER PUBLICATIONS

Buckwalter, G. R., *Pigment Handbook,* ed. Temple C. Patton, John Wiley & Sons, N.Y., (1972), pp. 617–624.

Primary Examiner—Amelia B. Yarbrough
Attorney, Agent, or Firm—Cynthia Berlow; Mitchell D. Bittman

[57] ABSTRACT

A direct process for the production of a printing ink base consists essentially of the steps of (1) reacting the starting ingredients for a pigment in an agitated vessel to obtain a product that contains pigment in mother liquor, (2) placing the product in a high horsepower, high shear mixer to transfer the pigment from the aqueous phase to a non-aqueous phase, and (3) while the material is still in the mixer, adding the necessary ingredients to make a printing ink base that can further be formulated into a printing ink.

4 Claims, 2 Drawing Figures

DIRECT PROCESS FOR THE PRODUCTION OF PRINTING INKS

BACKGROUND OF THE INVENTION

Printing inks are conventionally prepared by a series of steps that comprise (1) reacting the starting ingredients for the pigment in an agitated vessel to obtain a slurry containing about 1 to 3 percent of pigment in mother liquor, (2) filtering and washing the liquid reaction product of step (1) with water to remove the mother liquor and decrease the amount of water-soluble by-products to an acceptable level, forming a presscake that contains about 20 percent of pigment and 80 percent of water, (3) putting the presscake from step (2) into a high horsepower, high shear mixer for at least 15 hours to transfer the pigment from the aqueous phase to a non-aqueous phase to effect complete dispersion of the pigment in the non-aqueous phase, and (4) finally adjusting the batch by adding materials to insure proper rheology and color characteristics to meet the requirements of the printing ink manufacturer.

The pigment flush product from step (4) is then sold to the manufacturer of printing inks who then, at a different location, (5) mixes the pigment with additional varnish, e.g., resin, solvent, and, optionally, a drying oil, and conventional additives to prepare a printing ink that meets the customer's requirements.

Alternately, the pigment presscake from step (2) may be dried, the dry product mixed with the non-aqueous components, and the resulting paste subjected to high shear in dispersion equipment, such as a three-roll mill.

BRIEF DESCRIPTION OF THE INVENTION

It has now been found that a printing ink base with improved properties can be made in less time and at a reduced cost by a direct process that consists essentially of the steps of (1) reacting the starting ingredients for a pigment in an agitated vessel until a liquid reaction product is obtained that contains about 6 to 15 percent of pigment in mother liquor, (2) transferring the product of step (1) into a high horsepower, high shear mixer to transfer the pigment from the aqueous phase to the non-aqueous phase and to reduce to an acceptable level the water-soluble by-products, and then (3), while the material is still in the mixer, adding the ingredients to make a base ink that meets the customer's specifications.

DETAILED DESCRIPTION OF THE INVENTION

Figure 1:
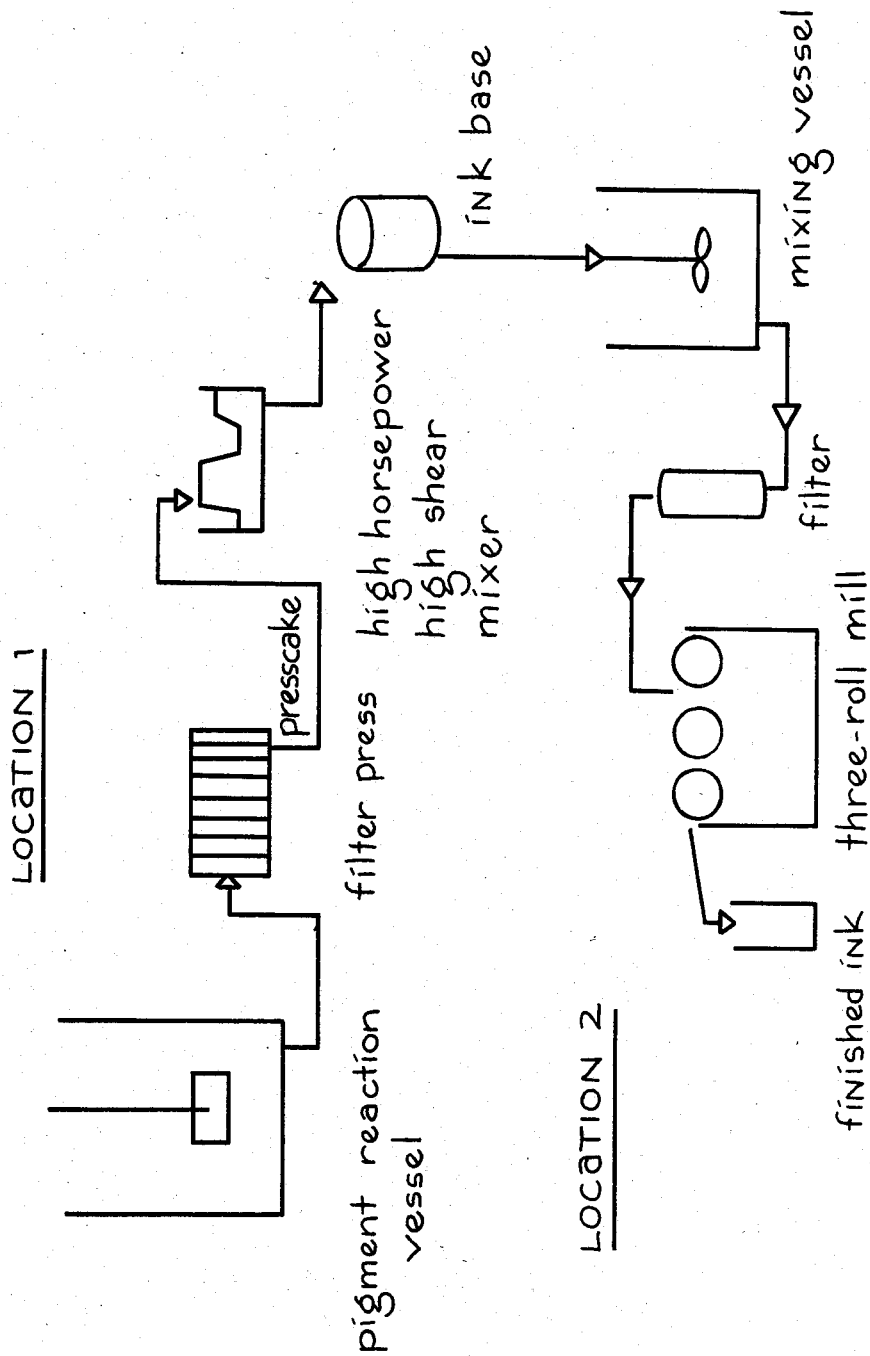
FIG. 1 is a flow diagram of the conventional process for manufacturing printing inks.
Figure 2:
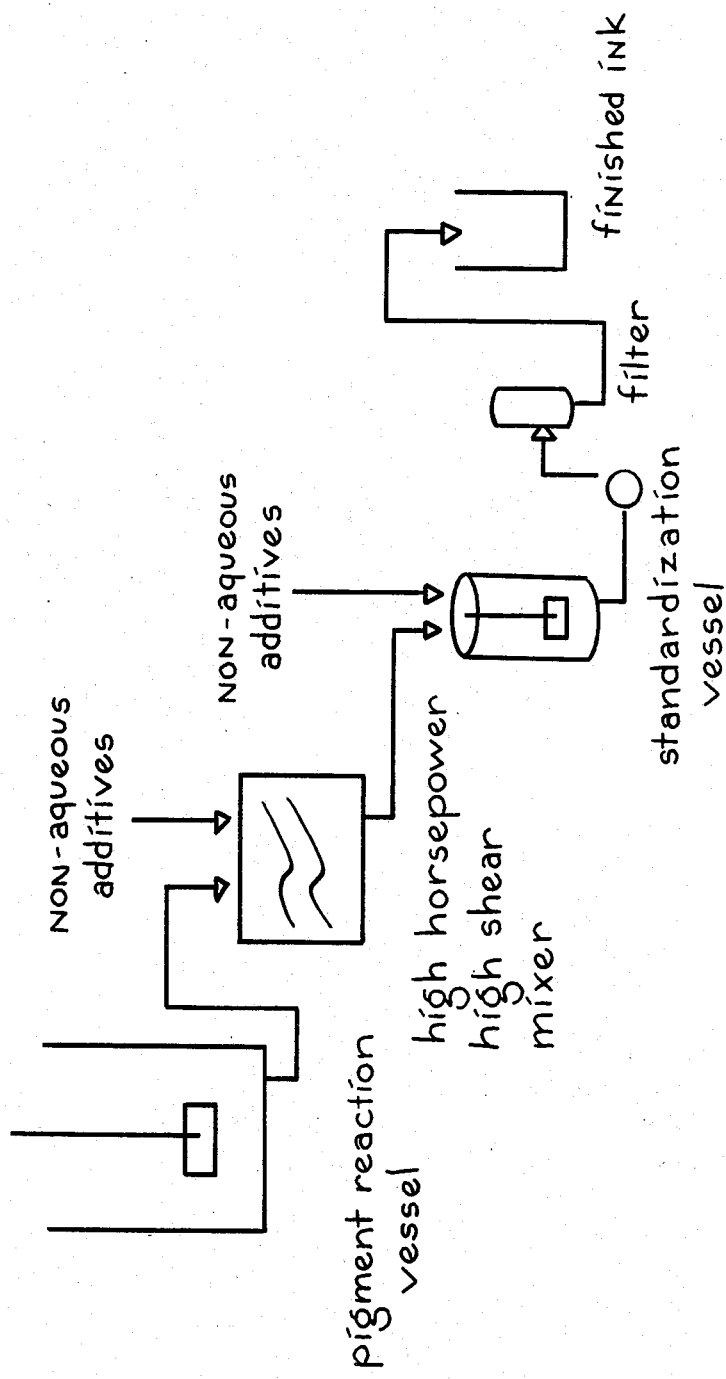
FIG. 2 is a flow diagram of the process of this invention for manufacturing printing inks.

A direct process for the production of a printing ink base consists essentially of the steps of (1) reacting the starting ingredients for a pigment in an agitated vessel to obtain a product that contains pigment in mother liquor, (2) placing the product in a high horsepower, high shear mixer to transfer the pigment from the aqueous phase to a non-aqueous phase, and (3) while the material is still in the mixer, adding the necessary ingredients to make a printing ink base that can further be formulated into a printing ink.

(1) The raw materials for making a pigment are fed into a strike tank equipped with a variable speed agitator; a source of heating generally, but not exclusively, steam; a thermometer; and a pH probe to establish acidity or alkalinity of the reaction. The ingredients are mixed for 2 to 6 hours until the reactions required for the manufacture of the pigment are complete.

(2) The reaction product from (1), containing 6 to 15 percent of pigment, is added to a heavy duty mixer, such as a Baker Perkins-type flusher, having high horsepower and high shear mixing. The pigment is transferred from an aqueous phase to a non-aqueous phase by the addition of a suitable printing ink-type varnish. The varnish preferentially wets the pigment and displaces the water which separates and is clear and free of pigment. The separated water is poured off, leaving a soft paste of pigment, varnish, and some residual water. The viscosity of this soft paste is gradually increased by further additions of pigment slurry and some varnishes as needed to aid pigment wetting and water separation. The final product is very heavy and stiff, requiring the horsepower and shear of a heavy duty mixer to produce an excellent dispersion of pigment in the chosen varnish.

The heavy mass is washed to remove soluble salts left from the pigment slurry. Fresh water is added, mixed, and poured off several times until a low conductivity value is reached. The final mass contains pigment, varnish, and 10 to 20 percent of residual water which can be removed under vacuum and heat or by open mixing to promote natural evaporation.

Finally, the mass is reduced to press-ready ink by the addition of more varnishes, solvents, driers, etc.

Typical resins used in the varnishes mentioned above include, but are not limited to, hydrocarbons, alkyds, phenolics, modified phenolics, rosin esters and modified rosin esters, and the like, and mixtures thereof, in an amount between about 45 to 70 percent, and preferably between about 25 and 50 percent, based on the weight of the oils.

A drying oil may be included in order to initially aid water breakout and to improve press characteristics. Typical oils include alkyds, linseed, soya, proprietary drying varnishes, and the like, and their mixtures, in an amount between about 5 and 25 percent, and preferably between about 5 and 10 percent, based on the weight of the total varnish.

The process of this invention is "system specific", that is, the specific materials selected and the amount of each depend upon the requirements of each customer. The amounts of the additives likewise vary with the desired properties of the finished ink, but generally they are used in amounts up to about three percent, and preferably about one percent, based on the weight of the finished ink.

The direct process of this invention is applicable to any pigment that is used in printing inks. Specific examples include, but are not limited to, Mono- and Diarylide Yellows, Lithol Rubine, Permanent Red 2B, Lithol Reds, Red Lake C, and Phthalocyanine Blue. It may be used to produce any ink system in which the essential vehicle is immiscible with water, such as for example offset or lithographic, publication gravure, and some packaging gravure and flexographic systems.

The total time that the material is in the flusher, from when the liquid reaction product from the strike tank is placed in the flusher until the finished printing ink is removed for packaging, is about 6 to 12 hours.

The process of this invention may be carried out in a continuous, semi-continuous, or batchwise manner.

As a result of using the direct process described herein, printing inks are obtained that have considerably improved properties. In addition, major economies have been effected in time, energy consumption, and money. By increasing the amounts of solids in the slurry made in the strike tank, there is less effluent, making it easier to transfer the pigment to the non-aqueous phase in the flusher and decreasing the amount of waste material, both liquid and solid, to be removed.

By making the printing ink directly in the flusher, the intermediate filtration and standardization steps are eliminated, saving time, money, and energy. More batches can be made in a given time; less handling of the pigment results in enhancement of color strength; the amount of raw material required is less than the amount required in the conventional process to produce the same strength.

The end products, suitably but not necessarily, offset or lithographic inks, are superior to inks made by the conventional process in properties such as color strength, gloss, transparency, cleanliness of hue, and dispersibility, and the quality of the ink product is consistent.

The process of this invention will be further illustrated by the following examples wherein all parts and percentages are by weight unless otherwise specified.

EXAMPLE 1

Pigment Yellow 12 slurry was prepared as follows:

1. To 2400 parts of ice in a make-up tank was added 680 parts of hydrochloric acid (35.5% or 20° Bé), followed by the addition of 350 parts of dichlorobenzidine 100% (as the dihydrochloride). The slurry was stirred for 30 minutes and then cooled down by the further addition of 1700 parts of ice to a temperature of 0° to −5° C. To this was added 10 parts of chelating agent. The slurry was stirred for 10 minutes at 0° to −5° C. To the cold slurry 532 parts of a 38.5% solution of sodium nitrite was added over 2 to 4 minutes. The reactants were stirred for 30 minutes to form the tetrazo of dichlorobenzidine; an excess of nitrite was maintained throughout. The tetrazo so prepared was then added to a strike tank containing 1000 parts of ice.

To 1600 parts of ice was added 500 parts of a 50 percent solution of sodium hydroxide, followed by the addition of 580 parts of a 70 percent solution of acetic acid. The mixture was stirred for 15 minutes, and then 525 parts of acetoacetanilide was added. The slurry so obtained was stirred for 30 minutes, and then 30 parts of a surface active agent was added.

The acetoacetanilide slurry was then cooled to 8° to 10° C. by the further addition of 1050 parts of ice. The pH of the slurry was 6.1 to 6.7 at 8° to 10° C.

The excess nitrite in the tetrazo was destroyed by the addition of 16 parts of sulfamic acid.

The acetoacetanilide slurry was added to the tetrazo in the strike tank in less than 20 minutes. The yellow-brown suspension obtained in the strike tank was stirred for 30 minutes to complete the reaction. The temperature was 8° to 12° C. throughout and the pH of the slurry after the reaction was 2.6 to 3.3. The yellow-brown slurry was then heated to 45° C. with direct steam, and 450 parts of a 50 percent solution of sodium hydroxide was added to adjust the pH of the slurry to 10.1 to 10.3. During the heat-up the slurry became cleaner and more yellow than yellow-brown.

To the above slurry was added 73 parts of the sodium salt of rosin dissolved in 250 parts of water at 50° C. The slurry was stirred for 5 minutes and then 37 parts of an inorganic salt was added. The slurry was stirred for 10 minutes more at 45° to 50° C. The final pH of the slurry was 6 to 6.5 with a temperature of 45° to 50° C. The slurry containing 8 to 10 percent of the yellow organic pigment was then available for addition to the high horsepower/high shear mixer.

2. To a Baker-Perkins high horsepower, high shear flusher were added 383 parts of the Yellow 12 strike tank slurry containing 8.7 percent of pigment (33 parts) and 66 parts of a quickset vehicle at 26 to 27 poises viscosity. The mixture was warmed to 50° to 60° C., and mixing was continued until the water separated and the oil-pigment phase collected together (approximately 30 to 60 minutes). The clear water was poured off. The oil phase was very soft.

Then 191 parts of Yellow 12 slurry (17 parts of pigment) was added, and mixing was continued until the water separated and the oil-pigment phase collected together (approximately 30 minutes). The mass was considerably heavier.

Then 191 parts of the Yellow 12 slurry (17 parts of pigment) was added, and mixing was continued until the water separated and the oil-pigment phase collected (approximately 15 to 20 minutes). The mass was very stiff. A total of 83 percent of water had been poured off. The mass was washed by adding 1500 parts of fresh tap water, mixing for 5 minutes, and then pouring off the water. This was done a total of 4 times. The conductivity before the washing was $7.554 \times 10,000$ mhos and after the washing it was $6.94 \times 1,000$ mhos.

The final washed mass consisted of 50 percent of pigment, 50 percent of varnish, and residual water.

This mass was mixed with 79 parts of quickset vehicle, 2 parts of an anti-skinning agent, and 3 parts of a hexyl carbitol softening agent, resulting in 216 parts of a base ink.

A final cut-back was made by mixing the 216 parts of base ink with 400 parts of gelled quickset varnish, 66 parts of a wax compound, 42 parts of petroleum distillate (boiling average 535° F.), 50 parts of petroleum distillate (boiling average 470° F.), and 59 parts of water, resulting in 833 parts of a press-ready printing ink containing 8.0 percent of pigment.

EXAMPLE 2

The procedure of Example 1 was repeated with each of the following pigments instead of Pigment Yellow 12: Lithol Rubine, Permanent Red 2B, Red Lake C, and Phthalocyanine Blue. The results were comparable.

What is claimed is:

1. A direct process for the production of a printing ink base that consists essentially of the steps of (1) reacting the starting ingredients for an organic pigment in an agitated vessel to obtain a product that contains about 6 to 15 percent of pigment in mother liquor, (2) placing the product of step (1) into a high horsepower, high shear mixer to transfer the pigment from the aqueous phase to a non-aqueous phase, and (3) while the material is still in the mixer, adding the ingredients to make a printing ink base.

2. The process of claim 1 where the printing ink base is formulated into a printing ink.

3. The process of claim 1 wherein the pigment is an azo pigment.

4. The process of claim 1 wherein the pigment is phthalocyanine.

* * * * *